US012545120B2

(12) United States Patent
Sugiyama

(10) Patent No.: US 12,545,120 B2
(45) Date of Patent: Feb. 10, 2026

(54) DRIVE DEVICE FOR RAILWAY VEHICLE

(71) Applicant: Mitsubishi Electric Corporation, Tokyo (JP)

(72) Inventor: Takuya Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 18/293,560

(22) PCT Filed: Aug. 6, 2021

(86) PCT No.: PCT/JP2021/029373
§ 371 (c)(1),
(2) Date: Jan. 30, 2024

(87) PCT Pub. No.: WO2023/013050
PCT Pub. Date: Feb. 9, 2023

(65) Prior Publication Data
US 2024/0343121 A1    Oct. 17, 2024

(51) Int. Cl.
*B60L 9/24*    (2006.01)
*B60L 13/00*    (2006.01)

(52) U.S. Cl.
CPC .............. *B60L 9/24* (2013.01); *B60L 13/006* (2013.01); *B60L 2200/26* (2013.01); *B60L 2210/30* (2013.01); *B60L 2210/40* (2013.01)

(58) Field of Classification Search
CPC .... H02M 1/32; H02M 1/4225; H02M 1/4216; H02M 1/10; H02M 1/4258; H02M 1/08; H02M 1/36; H02M 5/4585; H02M 5/458; H02M 7/217; H02M 7/219; H02M 7/003; H02M 7/797; H02M 7/48; H02M 7/06
See application file for complete search history.

(56) References Cited

U.S. PATENT DOCUMENTS

2013/0313059 A1    11/2013    Inarida et al.

FOREIGN PATENT DOCUMENTS

| JP | 2012065489 A |   | 3/2012 |  |
|----|--------------|---|--------|--|
| JP | 2014036534 A | * | 2/2014 | ................ B60L 9/28 |

(Continued)

OTHER PUBLICATIONS

JP_2014036534_A Translation (Year: 2014).*

(Continued)

*Primary Examiner* — Bryan R Perez
(74) *Attorney, Agent, or Firm* — Buchanan Ingersoll & Rooney PC

(57)    ABSTRACT

A drive device for a railway vehicle operates by receiving power supply from an alternating-current overhead contact line or a three-phase generator. The drive device for a railway vehicle is configured such that a voltage output from a main transformer is applied to alternating-current input ends in a converter circuit via a first switch. A first phase voltage among voltages output from the three-phase generator is applied to an alternating-current input end in a first leg of a brake chopper circuit via a second switch. Second and third phase voltages among the voltages output from the three-phase generator are applied to the alternating-current input ends, respectively, via the second switch.

7 Claims, 3 Drawing Sheets

(56) References Cited

FOREIGN PATENT DOCUMENTS

JP      2015012727 A    1/2015
WO      2012105282 A1   8/2012

OTHER PUBLICATIONS

International Search Report (PCT/ISA/210) with translation and Written Opinion (PCT/ISA/237) mailed on Oct. 19, 2021, by the Japan Patent Office as the International Searching Authority for International Application No. PCT/JP2021/029373. (9 pages).
Office Action (with translation) mailed on Nov. 7, 2023, by the Japan Patent Office for Japan Patent Application No. 2023-539560. (9 pages).

* cited by examiner

DRIVE DEVICE FOR RAILWAY VEHICLE

FIELD

The present disclosure relates to a drive device for a railway vehicle that operates by receiving power supply from either a single-phase power supply or a three-phase power supply.

BACKGROUND

In the following Patent Literature 1, a configuration example of a drive device for a railway vehicle that operates by receiving power supply from either an alternating-current overhead contact line or a three-phase alternating-current generator is described. The alternating-current overhead contact line and the three-phase alternating-current generator are a plurality of different alternating-current power supplies, and the three-phase alternating-current generator is driven by an engine.

In Patent Literature 1, a configuration is disclosed in which the drive device for a railway vehicle includes a power conversion circuit that includes: alternating-current input ends, the number of which corresponds to the maximum number of phases among a plurality of different alternating-current power supplies, and that converts alternating-current power into direct-current power; and a switching means for switching a connection state between the alternating-current power supplies and the power conversion circuit. The connection state is switched according to the alternating-current power supplies.

CITATION LIST

Patent Literature

Patent Literature 1: WO 2012/105282 A

SUMMARY OF INVENTION

Problem to be Solved by the Invention

However, in the drive device for a railway vehicle described in Patent Literature 1, a rectifier circuit that rectifies the three-phase alternating current output from the three-phase alternating-current generator is required separately from a rectifier circuit that rectifies a single-phase alternating current output from the alternating-current overhead contact line. The rectifier circuit to be added needs to be additionally provided to a unit on which the existing rectifier circuit is mounted, or a new unit needs to be provided. In a case where the rectifier circuit is additionally provided to the existing unit, a problem may arise, such as an increase in size of the device. In a case where a new unit is provided, problems may arise, such as an increase in installation space or a decrease in reliability due to an increase in the number of components.

The present disclosure has been made in view of the above, and an object of the present disclosure is to obtain a drive device for a railway vehicle that is capable of inhibiting an increase in size of the device, an increase in installation space, or a decrease in reliability.

Means to Solve the Problem

In order to solve the above problems and achieve the object, a drive device for a railway vehicle according to the present disclosure is a drive device for a railway vehicle that operates by receiving power supply from a single-phase power supply or a three-phase power supply. The drive device includes a converter circuit, an inverter circuit, a brake chopper circuit, and a power consumption circuit. The converter circuit includes a plurality of switching elements connected in a full bridge, and first and second alternating-current input ends. The converter circuit converts alternating-current power supplied from the single-phase power supply or the three-phase power supply into direct-current power. The inverter circuit includes a plurality of switching elements connected in a three-phase bridge. The inverter circuit converts the direct-current power supplied from the converter circuit into alternating-current power and supplies the alternating-current power obtained by conversion to a drive motor. The brake chopper circuit is connected in parallel to the converter circuit. The brake chopper circuit includes at least two legs in each of which a first switching element located on a high-potential side and a semiconductor element located on a low-potential side are connected in series. The two legs include a first leg in which a connection point between the first switching element and the semiconductor element forms a third alternating-current input end. The power consumption circuit includes a resistor connected in parallel to both ends of the semiconductor element. The power consumption circuit consumes surplus power of regenerative power generated when the drive motor operates as a generator by the resistor. A voltage output from the single-phase power supply is applied to the first and second alternating-current input ends via a first switch. In addition, a first phase voltage among voltages output from the three-phase power supply is applied to the third alternating-current input end via a second switch. In addition, second and third phase voltages among the voltages output from the three-phase power supply are applied to the first and second alternating-current input ends, respectively, via the second switch.

Effects of the Invention

According to the present disclosure, the drive device for a railway vehicle can obtain an effect that an increase in size of the device, an increase in installation space, or a decrease in reliability can be inhibited.

DESCRIPTION OF EMBODIMENTS

Hereinafter, a drive device for a railway vehicle according to embodiments of the present disclosure will be described in detail with reference to the accompanying drawings. Note that the embodiments described below are examples, and the scope of the present disclosure is not limited to the following embodiments. In addition, in the following description, physical connection and electrical connection are not distinguished from each other, and are simply referred to as "connection". That is, the term "connection" includes both a case where constituent elements are directly connected to each other and a case where constituent elements are indirectly connected to each other via another constituent element.

First Embodiment

Figure 1:
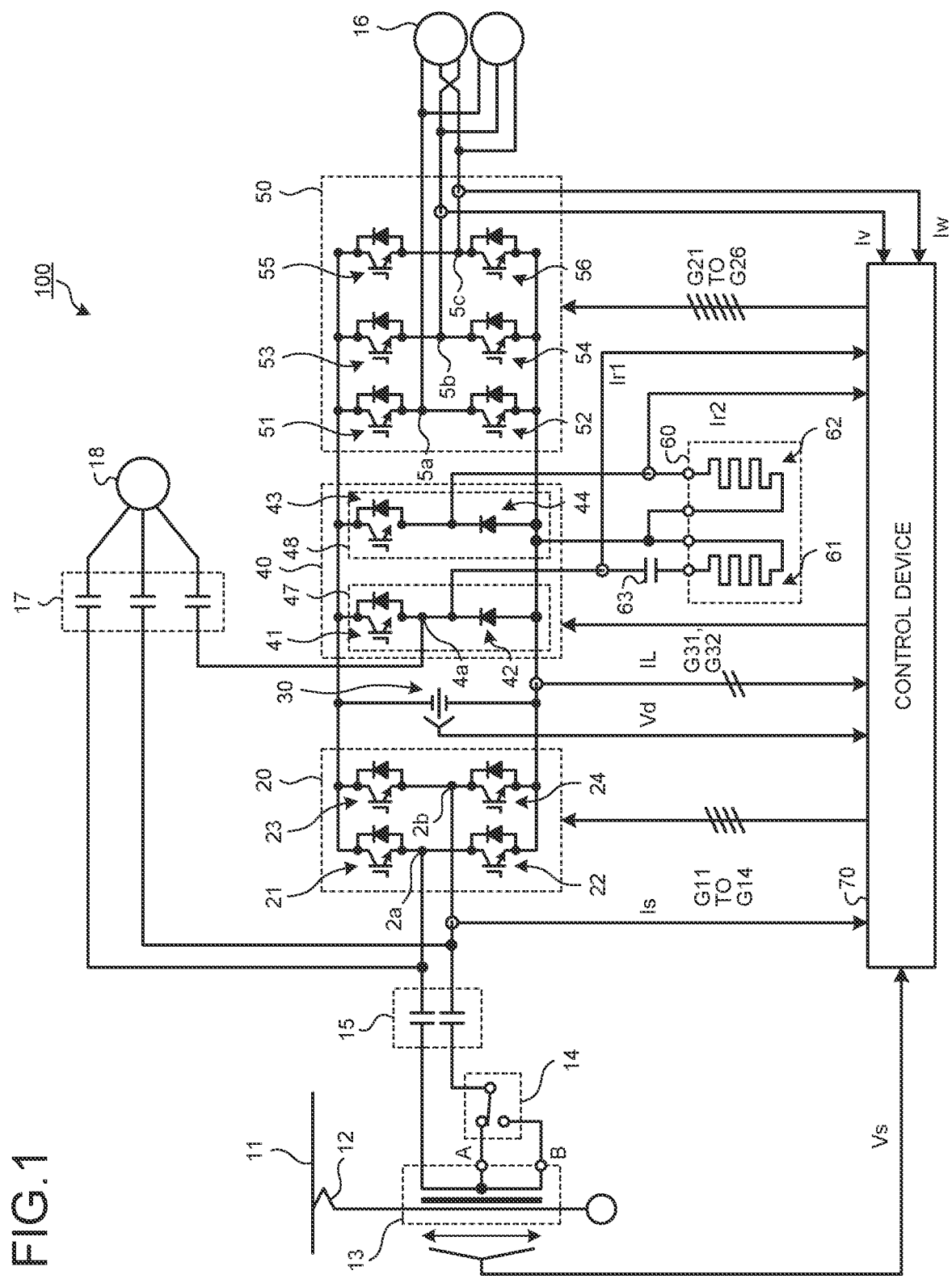
FIG. 1 is a diagram illustrating a configuration of a drive device for a railway vehicle according to a first embodiment.

FIG. 1 is a diagram illustrating a configuration of a drive device 100 for a railway vehicle according to a first embodiment. FIG. 1 illustrates a configuration example of a main circuit in the drive device 100 for a railway vehicle. The drive device 100 for a railway vehicle according to the first embodiment is a drive device that operates by receiving power supply from either a single-phase power supply or a three-phase power supply. FIG. 1 illustrates an alternating-current overhead contact line 11 as a single-phase power supply and a three-phase generator 18 as a three-phase power supply. An example of the three-phase generator 18 is a three-phase synchronous generator. In addition, FIG. 1 illustrates two drive motors 16 driven by the drive device 100 for a railway vehicle. The two drive motors 16 are installed in a truck of a railway vehicle (not illustrated) and provide a driving force to a set train including the railway vehicle.

The drive device 100 for a railway vehicle includes a converter circuit 20, a filter capacitor 30, a brake chopper circuit 40, an inverter circuit 50, a power consumption circuit 60, and a control device 70. Around the drive device 100 for a railway vehicle, a switching device 14, a first switch 15, and a second switch 17 are disposed. Electromagnetic contactors can be used as the switching device 14, the first switch 15, and the second switch 17. The electromagnetic contactor has low conduction loss when it is on. Therefore, the electromagnetic contactor is suitable as a peripheral circuit component for a railway vehicle in which a large current flows.

The voltage of the alternating-current overhead contact line 11 is applied to a primary side of a main transformer 13 via a power collector 12. The voltage applied to the primary side of the main transformer 13 is stepped down by the main transformer 13. The stepped-down voltage is output from a secondary side of the main transformer 13, and is applied to the converter circuit 20 via the switching device 14 and the first switch 15. In addition, a three-phase voltage output from the three-phase generator 18 is applied to the converter circuit 20 via the second switch 17. Note that the voltage on the secondary side of the main transformer 13 and the three-phase voltage of the three-phase generator 18 are not simultaneously applied to the converter circuit 20.

The converter circuit 20 includes switching elements 21 to 24 that are connected in a full bridge. Examples of the switching elements 21 to 24 are insulated gate bipolar transistors (IGBTs) illustrated in the drawing, but switching elements other than the IGBT may be used for the switching elements 21 to 24. A diode connected in reversely parallel is provided at both ends of each switching element. The reversely parallel is a connection form in which an anode of the diode is connected to an emitter of the IGBT and a cathode of the diode is connected to a collector of the IGBT. In a case where the switching elements 21 to 24 do not perform switching operation, the converter circuit 20 operates as a rectifier circuit using four diodes that are connected in a full bridge. In addition, the number of switching elements in the converter circuit 20 is not limited to four, and may be four or more corresponding to a circuit configuration such as a three-level converter or a multi-level converter.

The converter circuit 20 includes an alternating-current input ends 2a and 2b. A connection point between the switching elements 21 and 22 connected in series is the alternating-current input end 2a, and a connection point between the switching elements 23 and 24 connected in series is the alternating-current input end 2b. Note that, in the present specification, the alternating-current input end 2a may be referred to as a "first alternating-current input end" and the alternating-current input end 2b may be referred to as a "second alternating-current input end" in some cases.

The alternating-current input end 2a is connected to one end of the secondary side of the main transformer 13 via the first switch 15, and the alternating-current input end 2b is connected to another end of the secondary side of the main transformer 13 via the first switch 15 and the switching device 14. The another end of the secondary side is switched to either a tap end A or B. Here, the tap ends A and B will be explained.

For example, in Europe, the following two power supplies are commonly used as standards as the types of alternating-current power supplies.

(1) Power supply 1: AC 15 kV-16.7 Hz
(2) Power supply 2: AC 25 kV-50 Hz

When the type of the alternating-current power supply is only the power supply 1, the switching device 14 is fixed such that the input to the alternating-current input end 2b is output from the tap end B. Furthermore, when the type of the alternating-current power supply is only the power supply 2, the switching device 14 is fixed such that the input to the alternating-current input end 2b is output from the tap end A. In addition, in a case where the power supplies 1 and 2 are both used, the switching device 14 is switched to either the tap end A or B according to the type of alternating-current power supply. As a result, even in a railway vehicle traveling on a plurality of types of alternating-current power supplies, the voltage input to the drive device for a railway vehicle can be made substantially constant.

The filter capacitor 30 is connected to both output ends of the converter circuit 20. The filter capacitor 30 smooths and holds a direct-current voltage including a ripple output from the converter circuit 20.

In addition, the filter capacitor 30 is connected to both input ends of the inverter circuit 50. The direct-current voltage smoothed by the filter capacitor 30 is applied to the inverter circuit 50.

The inverter circuit 50 includes switching elements 51 to 56 that are connected in a three-phase bridge. Examples of the switching elements 51 to 56 are IGBTs illustrated in the drawing, but switching elements other than the IGBT may be used for the switching elements 51 to 56. A diode connected in reversely parallel is provided at both ends of each switching element.

The switching elements 51 and 52 are connected in series to form a U-phase leg, the switching elements 53 and 54 are connected in series to form a V-phase leg, and the switching elements 55 and 56 are connected in series to form a W-phase leg.

The inverter circuit 50 includes alternating-current output ends 5a, 5b, and 5c. A connection point between the switching elements 51 and 52 connected in series, that is, a connection point between the switching elements in the U-phase leg, is the alternating-current output end 5a. Similarly, a connection point between the switching elements in the V-phase leg is the alternating-current output end 5b, and a connection point between the switching elements in the W-phase leg is the alternating-current output end 5c.

The two drive motors 16 are each connected to the alternating-current output ends 5a, 5b, and 5c. As a result, three-phase alternating-current voltages output from the alternating-current output ends 5a, 5b, and 5c are applied to the two drive motors 16.

The brake chopper circuit 40 is connected in parallel to each of the converter circuit 20 and the inverter circuit 50.

The brake chopper circuit 40 includes a first leg 47 and a second leg 48. The first leg 47 includes a switching element 41 and a diode 42 connected in series. The second leg 48 includes a switching element 43 and a diode 44 connected in series.

Examples of the switching elements 41 and 43 are IGBTs illustrated in the drawing, but switching elements other than the IGBT may be used for the switching elements 41 and 43. A diode connected in reversely parallel is provided at both ends of each switching element.

In the first leg 47, the switching element 41 is located on a high-potential side, and the diode 42 is located on a low-potential side. That is, the diode 42 is connected to the switching element 41 such that an anode is located on the low-potential side compared to a cathode. In addition, in the second leg 48, the switching element 43 is located on the high-potential side, and the diode 44 is located on the low-potential side. That is, the diode 44 is connected to the switching element 43 such that an anode is located on the low-potential side compared to a cathode.

The first leg 47 includes an alternating-current input end 4a. A connection point between an emitter of the switching element 41 and the cathode of the diode 42 is the alternating-current input end 4a. Note that, in the present specification, the alternating-current input end 4a may be referred to as a "third alternating-current input end" in some cases. In addition, in the present specification, the switching element 41 in the first leg 47 including the alternating-current input end 4a may be referred to as a "first switching element" in some cases. Note that the second leg 48 does not include an alternating-current input end.

In addition, in the first leg 47, the diode 42 is an example of a semiconductor element. A switching element may be used instead of the diode 42. Note that the example of using a switching element will be described in a second embodiment described later.

The power consumption circuit 60 includes resistors 61 and 62. The resistors 61 and 62 are connected to the brake chopper circuit 40 such that the resistors 61 and 62 are connected in parallel to both ends of the diodes 42 and 44, respectively, in the brake chopper circuit 40. The power consumption circuit 60 consumes surplus power of regenerative power generated when the drive motor 16 operates as a generator by the resistors 61 and 62. Note that a switch 63 is provided between the diode 42 and the resistor 61. The operation of the switch 63 will be described later.

It is sufficient that the number of resistors in the power consumption circuit 60 are identical to or more than the number of legs in the brake chopper circuit 40. FIG. 1 illustrates a case in which the number of resistors is two, but may be three or more. In this case, it is sufficient to increase the number of second legs 48 including no alternating-current input end in the brake chopper circuit 40.

The respective switching elements included in the converter circuit 20, the brake chopper circuit 40, and the inverter circuit 50 described above are controlled by the control device 70. Detection values of a contact line voltage Vs, a converter input current Is, a capacitor voltage Vd, an inverter input current IL, motor currents Iv and Iw, and consumption currents Ir1 and Ir2 flowing through the respective resistors of the power consumption circuit 60 detected by the respective sensors are input to the control device 70.

The control device 70 generates drive signals G11 to G14 for turning on or off the respective switching elements 21 to 24 in the converter circuit 20 on the basis of the detection values of the contact line voltage Vs, the converter input current Is, and the capacitor voltage Vd. In addition, the control device 70 generates drive signals G21 to G26 for turning on or off the respective switching elements 51 to 56 in the inverter circuit 50 on the basis of the detection values of the inverter input current IL and the motor currents Iv and Iw. In addition, the control device 70 generates drive signals G31 and G32 for turning on or off the respective switching elements 41 and 43 in the brake chopper circuit 40 on the basis of the detection values of the capacitor voltage Vd and the consumption currents Ir1 and Ir2. Note that the use examples of the detection values described here are examples, and any detection values may be used as long as it is necessary for control. In addition, the exemplified detection values may not be used for simple control.

Next, an operation of the drive device 100 for a railway vehicle according to the first embodiment will be described.

First, in a case where a set train travels in an electrified section, the contact of the first switch 15 is closed and the contact of the second switch 17 is opened. The electrified section is a section in which power can be supplied from the alternating-current overhead contact line 11 to the set train. In this case, a single-phase alternating-current voltage is applied to the alternating-current input ends 2a and 2b of the converter circuit 20. The converter circuit 20 operates as a single-phase converter that converts the single-phase alternating-current voltage into a direct-current voltage.

The converter circuit 20 converts alternating-current power supplied from the main transformer 13 into direct-current power. The inverter circuit 50 converts the direct-current power supplied from the converter circuit 20 into alternating-current power, and supplies the alternating-current power obtained by conversion to the drive motors 16.

In a case where the set train travels in a non-electrified section or a case where power supply from the alternating-current overhead contact line 11 has trouble, the contact of the first switch 15 is opened, and the contact of the second switch 17 is closed. The non-electrified section is a section in which there is no power supply facility, such as the alternating-current overhead contact line 11, from the ground, and the train obtains power from a power source included in the train itself. In this case, a first phase voltage among the voltages output from the three-phase generator 18 is applied to the alternating-current input end 4a in the first leg 47 of the brake chopper circuit 40. The first phase is any arbitrary phase among the UVW phases in the three-phase alternating currents. In addition, second and third phase voltages among the voltages output from the three-phase generator 18 are applied to the alternating-current input ends 2a and 2b, respectively, of the converter circuit 20. The second phase is an arbitrary phase, other than the first phase, among the UVW phases, and the third phase is a remaining phase, other than the first and second phases, among the UVW phases. The converter circuit 20 and the first leg 47 of the brake chopper circuit 40 operate as a three-phase converter that converts the three-phase alternating-current voltages into a direct-current voltage. Note that, in this operation, each of the switching elements of the converter circuit 20 and the first leg 47 does not perform the switching operation, excluding exceptional cases. Therefore, the converter circuit 20 and the brake chopper circuit 40 operate as a three-phase rectifier circuit.

The converter circuit 20 and the first leg 47 convert the three-phase alternating-current power supplied from the three-phase generator 18 into direct-current power. The inverter circuit 50 converts the direct-current power supplied from the converter circuit 20 into alternating-current power, and supplies the alternating-current power obtained by conversion to the drive motors 16.

In a case where the drive device 100 for a railway vehicle operates by receiving power supply from the alternating-current overhead contact line 11, the first leg 47 and the second leg 48 operate as the brake chopper circuit 40, that is the original functions thereof. At this time, the contact of the switch 63 is closed. Therefore, in the power consumption circuit 60, surplus power is consumed by the two resistors 61 and 62. In a case where the drive device 100 for a railway vehicle operates by receiving power supply from the three-phase generator 18, only the second leg 48 operates as the original brake chopper circuit 40 that is the original function thereof, and the first leg 47 operates as a part of the circuit element of the three-phase converter. At this time, the contact of the switch 63 is opened. Therefore, in the power consumption circuit 60, surplus power is consumed only by the resistor 62. In a case where the consumption of the surplus power cannot be covered by the resistor 62 alone, it is sufficient to increase the number of resistors 62 and correspondingly, increase the number of legs of the second leg 48.

As has been described above, the drive device for a railway vehicle of the first embodiment is configured such that the voltage output from the single-phase power supply is applied to the first and second alternating-current input ends in the converter circuit via the first switch. In addition, the drive device for a railway vehicle of the first embodiment is configured such that the first phase voltage among the voltages output from the three-phase power supply is applied to the third alternating-current input end in the brake chopper circuit via the second switch, and the second and third phase voltages among the voltages output from the three-phase power supply are applied to the first and second alternating-current input ends, respectively, via the second switch. With such a configuration, there is no need to separately provide a rectifier circuit that rectifies the three-phase alternating current. This eliminates the need for additional provision of a new unit, so that an effect can be obtained that an increase in size of the device, an increase in installation space, or a decrease in reliability can be inhibited.

Note that, in FIG. 1, each of the converter circuit 20, the filter capacitor 30, the brake chopper circuit 40, the inverter circuit 50, and the power consumption circuit 60 is illustrated as an independent constituent element, but some of the constituent elements may be combined and housed in a single housing. For example, the power consumption circuit 60 may be housed in an identical housing together with the brake chopper circuit 40 to be formed as a power consumption unit. In addition, the brake chopper circuit 40 may be housed in an identical housing together with the inverter circuit 50 to be formed as an inverter unit. In addition, the brake chopper circuit 40 may be housed in an identical housing together with the converter circuit 20 to be formed as a converter unit. With such configurations, an effect can be obtained that the electric wiring connecting the constituent elements can be reduced while effectively using the space under the floor of the railway vehicle.

In addition, FIG. 1 illustrates a case in which both the circuit configurations of the converter circuit 20 and the inverter circuit 50 are two level configurations, but the present invention is not limited thereto. At least one of the converter circuit 20 and the inverter circuit 50 may have a circuit configuration of three levels, and the above-described effect can also be obtained.

Figure 2:
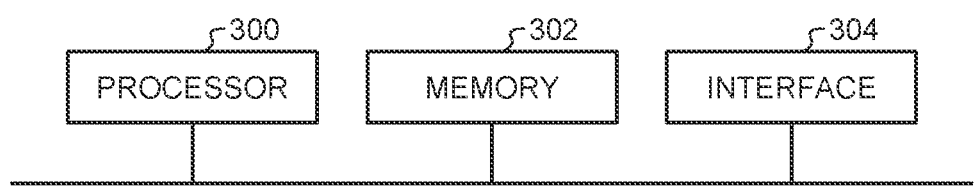
FIG. 2 is a block diagram illustrating an example of a hardware configuration that implements functions of a control device in the first embodiment.
Figure 3:
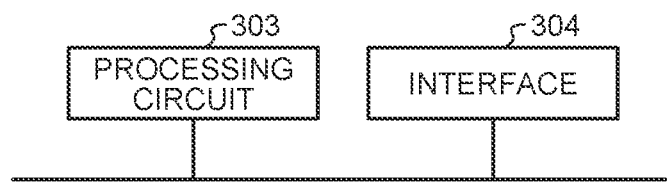
FIG. 3 is a block diagram illustrating another example of the hardware configuration that implements the functions of the control device in the first embodiment.

Next, a hardware configuration for implementing the functions of the control device 70 in the first embodiment will be described with reference to FIGS. 2 and 3. FIG. 2 is a block diagram illustrating an example of the hardware configuration that implements the functions of the control device 70 in the first embodiment. FIG. 3 is a block diagram illustrating another example of the hardware configuration that implements the functions of the control device 70 in the first embodiment.

In a case where some or all of the functions of the control device 70 in the first embodiment are implemented, a configuration including a processor 300, a memory 302, and an interface 304 as illustrated in FIG. 2 is used. The processor 300 performs a calculation. The memory 302 stores a program read by the processor 300. Signals are input and output through the interface 304.

The processor 300 may be a calculation means such as a calculation device, a microprocessor, a microcomputer, a central processing unit (CPU), or a digital signal processor (DSP). In addition, examples of the memory 302 include a nonvolatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disk, a mini disk, and a digital versatile disc (DVD).

The memory 302 stores the program for executing functions of the control device 70 in the first embodiment. The processor 300 can perform the above processing by transmitting and receiving necessary information via the interface 304, executing the program stored in the memory 302, and referring to a table stored in the memory 302. A result of calculation by the processor 300 can be stored in the memory 302.

In addition, in a case where some of the functions of the control device 70 in the first embodiment are implemented, a processing circuit 303 illustrated in FIG. 3 can also be used. The processing circuit 303 corresponds to a single circuit, a composite circuit, an application specific integrated circuit (ASIC), a field-programmable gate array (FPGA), or a combination thereof. Information input to the processing circuit 303 and information output from the processing circuit 303 can be obtained via the interface 304.

Note that some of the processes to be performed in the control device 70 may be performed by the processing circuit 303, and processes not performed by the processing circuit 303 may be performed by the processor 300 and the memory 302.

Second Embodiment

Figure 4:
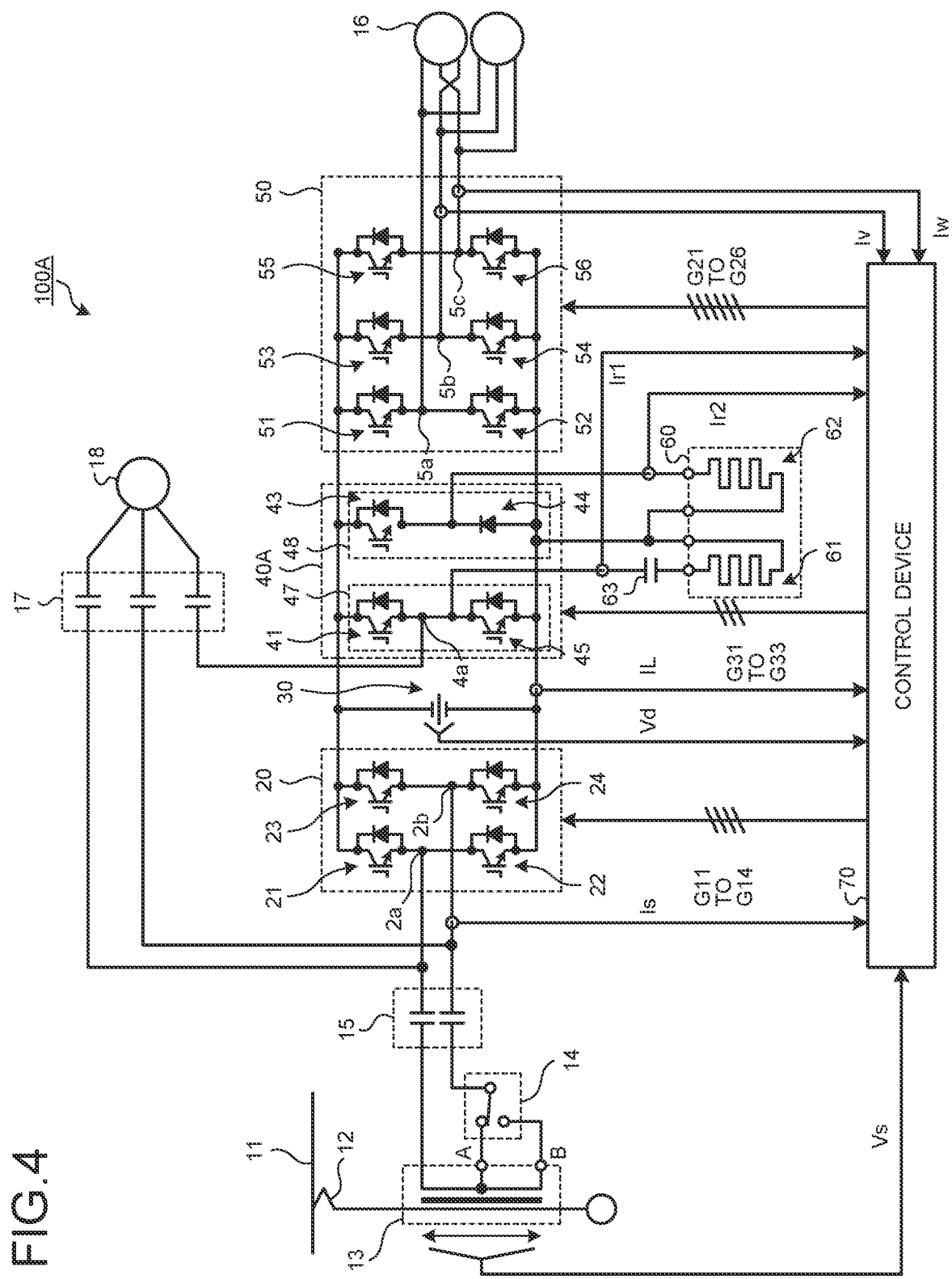
FIG. 4 is a diagram illustrating a configuration of a drive device for a railway vehicle according to a second embodiment.

FIG. 4 is a diagram illustrating a configuration of a drive device 100A for a railway vehicle according to the second embodiment. As compared with the drive device 100 for a railway vehicle illustrated in FIG. 1, in FIG. 4, the brake chopper circuit 40 is replaced with a brake chopper circuit 40A. In the brake chopper circuit 40A, the diode 42 is replaced with a switching element 45. Other configurations are identical or equivalent to those in the drive device 100 for a railway vehicle, and the constituent elements identical or equivalent to those in the drive device 100 are denoted by like reference numerals and detailed description thereof will be omitted. Note that, in the present specification, the switching element 45 may be referred to as a "second switching element" in some cases.

According to the brake chopper circuit 40A, the first leg 47 has the same configuration as the two legs in the converter circuit 20 by applying the second switching element including a reversely parallel connection diode. Therefore, the total six switching elements included in the converter circuit 20 and the first leg 47 can be used as a three-phase converter by performing switching operations. As a result, as the three-phase generator 18, a three-phase induction generator, an output voltage of which cannot be adjusted by itself, can be used in addition to the three-phase synchronous generator. The three-phase induction generator has an advantage that a structure is simpler than that of the three-phase synchronous generator, and an exciting device is unnecessary. Therefore, as compared with a case of using the three-phase synchronous generator, an effect can be obtained that the manufacturing cost and the maintenance cost can be reduced.

The above configurations described in the embodiments are examples, and can be combined with other known techniques, and the above configurations can be partly omitted or changed without departing from the gist.

REFERENCE SIGNS LIST 2a, 2b, 4a alternating-current input end; 5a, 5b, 5c alternating-current output end; 11 alternating-current overhead contact line; 12 power collector; 13 main transformer; 14 switching device; 15 first switch; 16 drive motor; 17 second switch; 18 three-phase generator; 20 converter circuit; 21 to 24, 41, 43, 45, 51 to 56 switching element; 30 filter capacitor; 40, 40A brake chopper circuit; 42, 44 diode; 47 first leg; 48 second leg; 50 inverter circuit; 60 power consumption circuit; 61, 62 resistor; 63 switch; 70 control device; 100, 100A drive device for railway vehicle; 300 processor; 302 memory; 303 processing circuit; 304 interface; A, B tap end.

The invention claimed is:

1. A drive device for a railway vehicle that operates by receiving power supply from a single-phase power supply or a three-phase power supply, the drive device comprising:
a converter circuit including a plurality of switching elements connected in a full bridge, and first and second alternating-current input ends, the converter circuit to convert alternating-current power supplied from the single-phase power supply or the three-phase power supply into direct-current power;
an inverter circuit including a plurality of switching elements connected in a three-phase bridge, the inverter circuit to convert the direct-current power supplied from the converter circuit into alternating-current power and to supply the alternating-current power obtained by conversion to a drive motor;
a brake chopper circuit including at least two legs in each of which a first switching element located on a high-potential side and a semiconductor element located on a low-potential side are connected in series, the two legs including a first leg in which a connection point between the first switching element and the semiconductor element forms a third alternating-current input end, the brake chopper circuit being connected in parallel to the converter circuit; and
a power consumption circuit including a resistor connected in parallel to both ends of the semiconductor element, the power consumption circuit to consume surplus power of regenerative power generated when the drive motor operates as a generator by the resistor, wherein
a voltage output from the single-phase power supply is applied to the first and second alternating-current input ends via a first switch, a first phase voltage among voltages output from the three-phase power supply is applied to the third alternating-current input end via a second switch, and second and third phase voltages among the voltages output from the three-phase power supply are applied to the first and second alternating-current input ends, respectively, via the second switch.

2. The drive device for a railway vehicle according to claim 1, wherein
the converter circuit operates as a single-phase converter when receiving power supply from the single-phase power supply.

3. The drive device for a railway vehicle according to claim 1, wherein
the converter circuit and the first leg operate as a three-phase converter when receiving power supply from the three-phase power supply.

4. The drive device for a railway vehicle according to claim 1, wherein
the semiconductor element is a diode, and
the diode is connected to the first switching element such that an anode of the diode is located on the low-potential side compared to a cathode of the diode.

5. The drive device for a railway vehicle according to claim 1, wherein
the semiconductor element is a second switching element including a reversely parallel connection diode.

6. The drive device for a railway vehicle according to claim 1, wherein
the brake chopper circuit is housed in an identical housing together with the inverter circuit to form an inverter unit.

7. The drive device for a railway vehicle according to any claim 1, wherein
the brake chopper circuit is housed in an identical housing together with the converter circuit to form a converter unit.

* * * * *